Figure 1A:
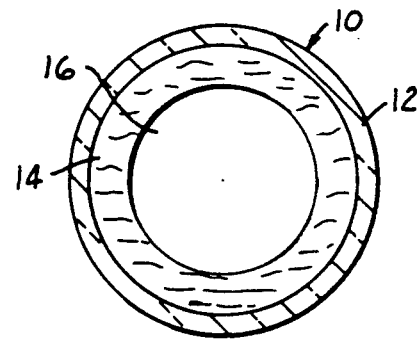
Figure 1B:
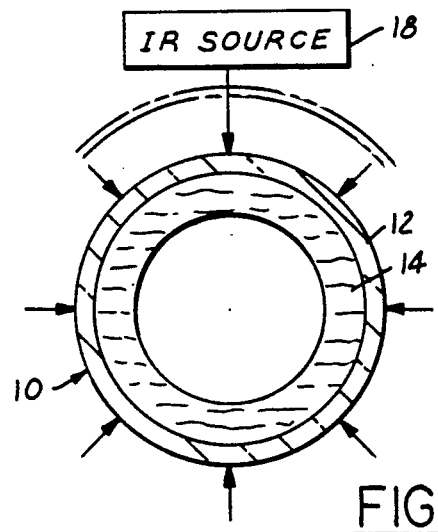
Figure 1C:
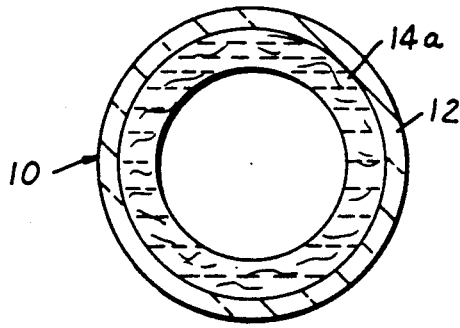
Figure 1D:
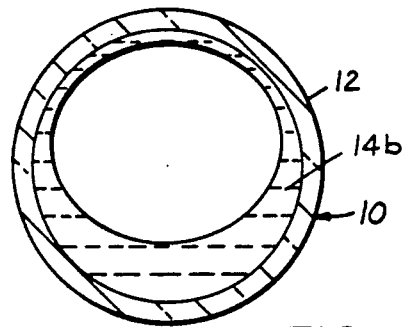

United States Patent [19]

Musinski et al.

[11] Patent Number: 5,043,131
[45] Date of Patent: Aug. 27, 1991

[54] IGNITION OF DEUTERIUM-TRTIUM FUEL TARGETS

[75] Inventors: Donald L. Musinski, Saline; Michael T. Mruzek, Britton, both of Mich.

[73] Assignee: KMS Fusion, Inc., Ann Arbor, Mich.

[21] Appl. No.: 451,607

[22] Filed: Dec. 18, 1989

[51] Int. Cl.⁵ .............................................. G21B 1/00
[52] U.S. Cl. ................................................... 376/103
[58] Field of Search ............... 376/103, 104, 105, 106, 376/152, 916

[56] References Cited

U.S. PATENT DOCUMENTS

| | | | |
|---|---|---|---|
| 3,624,239 | 11/1971 | Fraas | 376/103 |
| 3,723,246 | 3/1973 | Lubin | 376/103 |
| 3,762,992 | 10/1973 | Hedstrom | 376/103 |
| 3,826,561 | 7/1974 | Gregg | 376/104 |
| 3,953,617 | 4/1976 | Smith et al. | |
| 3,967,215 | 6/1976 | Bellak | 376/103 |
| 4,158,598 | 6/1979 | Baird | 376/103 |
| 4,258,075 | 3/1981 | Hendricks | |
| 4,277,305 | 7/1981 | Bohachevsky | 376/103 |
| 4,464,413 | 8/1984 | Murphy et al. | 376/152 |
| 4,525,323 | 6/1985 | Bangerter et al. | 376/152 |

OTHER PUBLICATIONS

J. Vac. Technol., vol. 20, No. 4, (Apr., 1982), pp. 1381-1387, Frank et al.
J. Appl. Phys. 63(7) (4/88), pp. 2217-2220.
Adv. Cryo. Eng., vol. 21, pp. 455-465 (1976).

Primary Examiner—Harvey E. Behrend
Attorney, Agent, or Firm—Barnes, Kisselle, Raisch, Choate, Whittemore & Hulbert

[57] ABSTRACT

A method of igniting a deuterium-tritium ICF fuel target to obtain fuel burn in which the fuel target initially includes a hollow spherical shell having a frozen layer of DT material at substantially uniform thickness and cryogenic temperature around the interior surface of the shell. The target is permitted to free-fall through a target chamber having walls heated by successive target ignitions, so that the target is uniformly heated during free-fall to at least partially melt the frozen fuel layer and form a liquid single-phase layer or a mixed liquid/solid bi-phase layer of substantially uniform thickness around the interior shell surface. The falling target is then illuminated from exteriorly of the chamber while the fuel layer is at substantially uniformly single or bi-phase so as to ignite the fuel layer and release energy therefrom.

7 Claims, 1 Drawing Sheet

IGNITION OF DEUTERIUM-TRTIUM FUEL TARGETS

The U.S. government has rights to this invention pursuant to Contract No. DE-AC03-87DP10560 between the Department of Energy and applicants' assignee.

The present invention is directed to ignition of cryogenic deuterium-tritium ICF fuel targets.

It has heretofore been proposed in U.S. Pat. No. 4,432,933, for example, to provide an ICF fuel target in the form of a hollow spherical shell of glass, ceramic, metal or plastic composition, and a frozen layer of deuterium-tritium (DT) fuel at substantially uniform thickness and cryogenic temperature around the interior wall surface of the shell. The shell is illuminated by high-intensity laser energy or the like, while the fuel layer is maintained in solid phase, to ignite the fuel layer and obtain release of neutrons and other energies. An optical system for illuminating such a fuel target is illustrated, for example, in U.S. Pat. No. 4,657,721.

Although the art of target fabrication and illumination has progressed significantly, improvements remain desirable. For example, efforts continue to be made toward improving uniformity of the fuel layer around the interior surface of the shell wall. Further, it is difficult to maintain the fuel target at cryogenic temperatures prior to illumination/ignition, particularly in systems for obtaining rapid ignition of sequential targets to release energy on a continuous basis, as would be needed for commercial application of ICF technology. It is therefore a general object of the present invention to provide a method of irradiating a DT fuel target that obtains enhanced uniformity of the fuel target layer, that may be employed for sequential ignition of multiple targets, and that employs the heat of ignition of multiple targets within a target chamber to enhance target layer uniformity in subsequently ignited targets.

Figure 2:
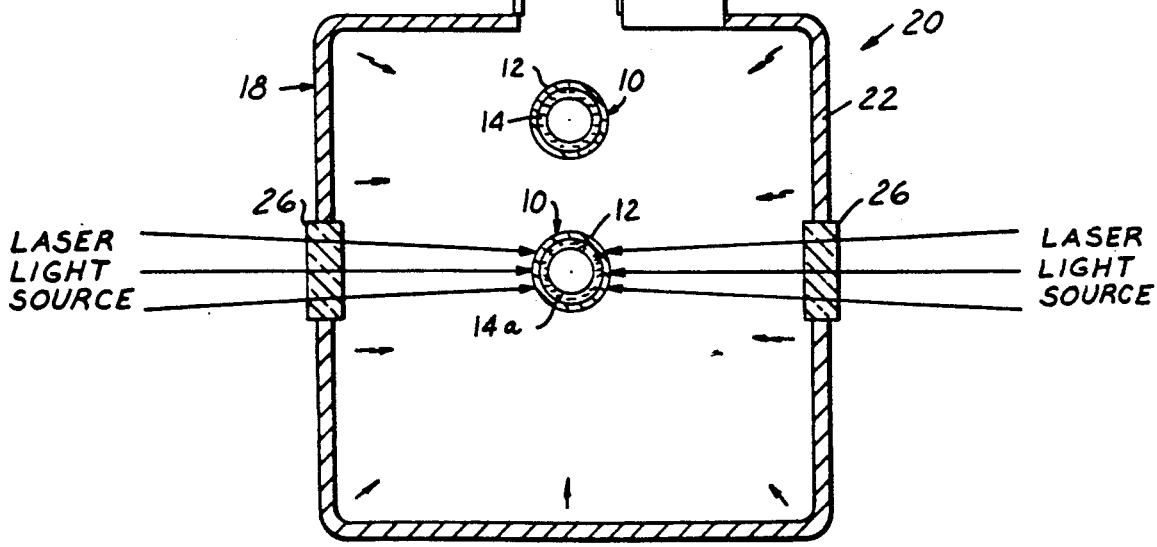

The invention, together with additional objects, features and advantages thereof, will be best understood from the following description, the appended claims and the accompanying drawing in which:

FIGS. 1A-1D together comprise a schematic diagram of target irradiation in accordance with the present invention; and FIG. 2 is a schematic diagram of a target illumination system in one implementation of the invention.

In accordance with the present invention illustrated in the drawing, a target 10 is provided having an outer shell 12 of uniform radius and thickness, and of glass, ceramic, metal, plastic or other suitable composition. A solid layer 14 of DT material is frozen at substantially uniform thickness and cryogenic temperature around the interior surface of shell 12, leaving a hollow interior 16 of fuel vapor or vacuum. Typically, in implementation of the present invention, shell 12 has an internal diameter greater than or equal to one millimeter, preferably on the order of tens of millimeters. Layer 14 has a thickness of at least ten micrometers, preferably at least twenty micrometers, and is maintained below the freezing point of DT fuel at a temperature of 18.7° K.

Target 10 may be fabricated in accordance with the teachings of U.S. Pat. No. 4,432,933 by placing preformed shells of glass, ceramic, metal or plastic composition into a vessel containing deuterium-tritium gas at elevated pressure and temperature, less than the softening temperature of the shell. The shells are maintained within the vessel for a time sufficient to permit permeation of fuel material through the shell walls in an amount sufficient to possess substantially elevated pressure at room temperature, after which the temperature and pressure within the vessel are reduced and the shells are removed. The shells are then suspended within a helium atmosphere at less than 13° K. rapidly to freeze the fuel material around the interior wall surface of the shell. Other "quick freeze" techniques for forming cryogenic targets are disclosed in Henderson et al, "Techniques for Obtaining Cryogenic Laser Fusion Targets by Condensing Fuel Gases in MICROSHELL Pellets," Adv. Cryo. Eng., 21, p 455–465 (1976), and in U.S. Pat. Nos. 3,953,617, 4,221,186 and 4,258,075. See also Mruzek et al, "Experimental Verification of Beta-Decay-Driven Sublimation in Deuterium-Tritium Ice Held in Spherical Fusion Targets." J. App. Phys., 63, 7 (Apr. 1, 1988) p 2217–2220.

Shell 10 is then uniformly heated (FIG. 1B), such as by subjection of the shell to infrared radiation from an isothermal source 18 that impinges upon shell 12 substantially uniformly around the outer surface of the shell. Such irradiation is continued for a time sufficient to melt at least a portion of fuel layer 14 so as to form a layer 14a (FIG. 1C) that is either in liquid phase or in mixed liquid/solid bi-phase. Preferably, target 10 is ignited at the stage of FIG. 1C before layer 14a has had an opportunity to slump or sag under force of gravity to form the non-uniform layer 14b illustrated in FIG. 1D.

FIG. 2 illustrates a target ignition system 20 that includes a hollow chamber 22 having a port 24 at the upper center thereof for admitting frozen targets 10 from a suitable source (not shown). Windows 26 in the sidewalls of chamber 22 admit high-intensity pulsed laser energy from a suitable source (not shown) for igniting sequential targets 10 as they freefall through chamber 22 to a position in alignment with windows 26. Conventional timing apparatus synchronize release of targets 10 and illumination through windows 26. Energy released by ignition of sequential targets 10 heats the walls of chamber 22, so that chamber 22 forms isothermal IR source 18 (FIG. 1B) by irradiating the interior of the chamber, and therefore targets 10 free-falling through the chamber, with a uniform intensity of infrared energy.

That is, targets 10 are initially frozen (FIG. 1A) as released into chamber 22, in which the frozen targets are subjected to uniform infrared radiation as they freefall through the target chamber. The distance of freefall between port 24 and the ignition point aligned with windows 26 is coordinated with target size, steady-state chamber operating temperature, absorbtivity of the shall and other factors, so that the DT fuel layer is in liquid or mixed liquid/solid phase 14a (FIG. 1C) at the point of alignment with windows 26 and illumination by the external laser light source. A gate 28 is positioned at the upper portion of chamber 22, and may be selectively closed so as to close port 24 during ignition of sequential targets 10.

In accordance with the critical feature of the present invention, fuel layer 14a is thus ignited while in single liquid phase or mixed liquid/solid phase and at uniform thickness around the interior of the shell. The liquid or mixed liquid/solid phase functions to smooth out the effects of any surface defects in the initial solid layer (14) because of the strong surface tension effects of sharp crystallites. In addition, the increased vapor phase pressure in the hollow interior portion 16 of the target is a valuable addition to the efficiency of the target design. Fuel sag (FIG. 1D) is reduced or eliminated by the effect of target free-fall within chamber 22. Further, chamber heat is employed efficiently to heat the fuel layer. Thus, the preferred implementation of the invention improves target uniformity, and therefore energy release, in a scheme of multiple sequential target ignitions.

The invention claimed is:

1. A method of igniting a deuterium-tritium (DT) fuel target to obtain fuel burn comprising the steps of:
 (a) providing a fuel target that includes a hollow spherical shell having a frozen layer of DT material at substantially uniform thickness and cryogenic temperature around the interior surface of said shell,
 (b) heating the fuel target uniformly to at least partially melt said frozen layer and form a liquid single phase layer or a mixed liquid/solid bi-phase layer of substantially uniform thickness around said interior surface, and
 (c) directing ignition energy onto said target from exteriorly of said target with said layer in said substantially uniform single or bi-phase state to ignite said DT layer.

2. The method set forth in claim 1 wherein said steps (b) and (c) are carried out while said target is free-falling so as to minimize sag of said layer while in said liquid or mixed liquid/solid phase.

3. The method set forth in claim 1 wherein said step (b) is carried out by subjecting said target to an environment of substantially uniform infrared radiation.

4. The method set forth in claim 3 wherein said steps (b) and (c) are carried out while said target is free-falling within a chamber, said step (b) being carried out by subjecting said target during free-fall to infrared energy radiated by interior wall surfaces of said chamber heated by previous fuel ignitions.

5. The method set forth in claim 1 wherein said steps (b) and (c) are carried out while said target is free-falling within a chamber, said step (b) being carried out by subjecting said target during free-fall to infrared energy radiated by interior wall surfaces of said chamber heated by previous fuel ignitions.

6. A method of igniting an ICF laser-fusion fuel target comprising the steps of:
 (a) providing a target that comprises a hollow spherical shell and a uniform layer of deuterium-tritium fuel material in sold phase around the interior of the shell wall,
 (b) permitting the target to free-fall into a target chamber while exposing the target to radiation for a time sufficient to melt at least a portion of said solid-phase layer to form a layer of fuel material in liquid phase or a mixture of liquid and solid phases, and
 (c) illuminating the falling target in the target chamber with ignition energy while the fuel layer material is in liquid phase or liquid/solid bi-phase.

7. The method set forth in claim 6 wherein said steps (b) and (c) are carried out in a repetitive alternating sequence to release energy that heats said chamber, and wherein said step of exposing said target to radiation is accomplished by exposing said target to infrared energy internally radiated by the walls of said chamber.

* * * * *